US011293935B2

(12) United States Patent
Konishi et al.

(10) Patent No.: US 11,293,935 B2
(45) Date of Patent: Apr. 5, 2022

(54) AUTOMATIC ANALYSIS DEVICE (71) Applicant: Hitachi High-Technologies Corporation, Tokyo (JP)

(72) Inventors: Rei Konishi, Tokyo (JP); Akihisa Makino, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 401 days.

(21) Appl. No.: 16/081,259

(22) PCT Filed: Jan. 12, 2017

(86) PCT No.: PCT/JP2017/000693
§ 371 (c)(1),
(2) Date: Aug. 30, 2018

(87) PCT Pub. No.: WO2017/149940
PCT Pub. Date: Sep. 8, 2017

(65) Prior Publication Data
US 2019/0072577 A1    Mar. 7, 2019

(30) Foreign Application Priority Data
Mar. 4, 2016    (JP) .............................. JP2016-041706

(51) Int. Cl.
*G01N 35/04* (2006.01)
*G01N 35/02* (2006.01)
(Continued)

(52) U.S. Cl.
CPC .......... *G01N 35/04* (2013.01); *B01L 3/50825* (2013.01); *B01L 3/523* (2013.01);
(Continued)

(58) Field of Classification Search
CPC .... G01N 35/04; G01N 35/1002; G01N 35/00; G01N 35/1079; G01N 35/025;
(Continued)

(56) References Cited

U.S. PATENT DOCUMENTS 4,764,342 A    8/1988 Kelln et al.
4,943,164 A    7/1990 Ohishi et al.
(Continued)

FOREIGN PATENT DOCUMENTS

JP    61-501167 A    6/1986
JP    2-59672 A    2/1990
(Continued)

OTHER PUBLICATIONS

Extended European Search Report issued in counterpart European Application No. 17759412.4 dated Oct. 9, 2019 (nine (9) pages).
(Continued)

*Primary Examiner* — Benjamin R Whatley
*Assistant Examiner* — Curtis A Thompson
(74) *Attorney, Agent, or Firm* — Crowell & Moring LLP (57) ABSTRACT

An automatic analysis device includes a reagent container, a reagent disk for holding the reagent container, a dispensing mechanism for dispensing a solution into the reagent container, an inversion mixing mechanism for subjecting the reagent container to inversion mixing, and a control unit for controlling the dispensing mechanism and the inversion mixing mechanism. The inversion mixing mechanism has a rotating mechanism for rotating the reagent container and a tilting mechanism for tilting a rotating shaft of the reagent container. The reagent container has a lid which can be pierced. The lid has a tubular mechanism having an opening part formed at the tip end and extending inside the reagent container. The control unit controls the dispensing conditions of the dispensing mechanism.

12 Claims, 8 Drawing Sheets

(51) Int. Cl.
- *G01N 35/10* (2006.01)
- *G01N 35/00* (2006.01)
- *B01L 3/00* (2006.01)
- *G01N 37/00* (2006.01)
- *B01F 31/00* (2022.01)
- *B01F 35/90* (2022.01)

(52) U.S. Cl.
CPC ........... *G01N 35/00* (2013.01); *G01N 35/025* (2013.01); *G01N 35/1002* (2013.01); *G01N 35/1016* (2013.01); *G01N 35/1079* (2013.01); *B01F 31/00* (2022.01); *B01F 35/90* (2022.01); *B01L 3/00* (2013.01); *B01L 2200/141* (2013.01); *B01L 2200/16* (2013.01); *B01L 2300/044* (2013.01); *B01L 2300/049* (2013.01); *G01N 35/02* (2013.01); *G01N 37/00* (2013.01); *G01N 2035/00524* (2013.01); *G01N 2035/0443* (2013.01); *G01N 2035/0444* (2013.01)

(58) Field of Classification Search
CPC .... G01N 35/1016; G01N 35/02; G01N 37/00; G01N 2035/00524; G01N 2035/0443; G01N 2035/0444; B01L 3/50825; B01L 3/523; B01L 3/00; B01L 2200/16; B01L 2300/049; B01L 2200/141; B01L 2300/044; B01F 15/06; B01F 11/00
See application file for complete search history.

(56) References Cited

U.S. PATENT DOCUMENTS

| | | | | |
|---|---|---|---|---|
| 5,154,896 A | * | 10/1992 | Mochida | B01J 16/00 422/209 |
| 5,342,346 A | * | 8/1994 | Honda | A61J 1/2089 604/411 |
| 5,578,272 A | * | 11/1996 | Koch | B01L 9/06 422/430 |
| 5,580,524 A | | 12/1996 | Forrest et al. | |
| 5,788,928 A | | 8/1998 | Carey et al. | |
| 2003/0137675 A1 | * | 7/2003 | Minagawa | G03G 21/105 358/1.1 |
| 2006/0124196 A1 | * | 6/2006 | Bartholomew | G07F 11/165 141/100 |
| 2006/0159587 A1 | * | 7/2006 | Fechtner | G01N 35/025 422/64 |
| 2012/0301359 A1 | * | 11/2012 | Kraemer | G01N 35/1002 422/64 |
| 2014/0016431 A1 | * | 1/2014 | Takenaka | B01F 11/0062 366/108 |
| 2014/0036615 A1 | * | 2/2014 | Okuda | B01F 11/0062 366/114 |
| 2015/0368606 A1 | * | 12/2015 | Bishop | G01N 35/04 435/34 |
| 2018/0080952 A1 | * | 3/2018 | Lehtonen | B01F 15/00175 |

FOREIGN PATENT DOCUMENTS

| | | | |
|---|---|---|---|
| JP | 4-208864 A | | 7/1992 |
| JP | 6-18531 A | | 1/1994 |
| JP | 2002-19855 A | | 1/2002 |
| JP | 2011-153936 A | | 8/2011 |
| JP | 2014-168769 A | | 9/2014 |
| JP | 2015150113 A | * | 8/2015 |
| WO | WO 85/03571 | | 8/1985 |

OTHER PUBLICATIONS

International Search Report (PCT/ISA/210) issued in PCT Application No. PCT/JP2017/000693 dated Apr. 18, 2017 with English translation (five (5) pages).

Japanese-language Written Opinion (PCT/ISA/237) issued in PCT Application No. PCT/JP2017/000693 dated Apr. 18, 2017, including Written Reply with English translation (20 pages).

Japanese-language International Preliminary Report on Patentability (PCT/IPEA/409) issued in PCT Application No. PCT/JP2017/000693 dated Feb. 2, 2018 (12 pages).

International Preliminary Report on Patentability (PCT/IB/338 & PCT/IPEA/409) issued in PCT Application No. PCT/JP2017/00693 dated Sep. 7, 2018 (seven (7) pages).

* cited by examiner

UPSIDE-DOWN STATE
VOLUME = SMALL

UPRIGHT STATE
VOLUME = LARGE

AMOUNT OF FIRST DISPENSING:
VOLUME OF DISSOLVED REAGENT
SUCH THAT LIQUID SURFACE IS BELOW
OPENING IN UPSIDE-DOWN STATE
"VOLUME = SMALL"

AMOUNT OF SECOND DISPENSING:
VOLUME OF DISSOLVED REAGENT
SUCH THAT LIQUID SURFACE IS BELOW
OPENING IN UPRIGHT STATE
"VOLUME = LARGE"

AUTOMATIC ANALYSIS DEVICE

TECHNICAL FIELD

The present invention relates to automatic analysis devices for automatically analyzing components contained in biological samples such as blood, and particularly to an automatic analysis device including an automatic dissolving mechanism for a freeze-dried reagent.

BACKGROUND ART

Automatic analysis devices analyze a component in a biological sample by mixing and reacting the biological sample with a reagent. Reagents used therein include liquid reagents and freeze-dried reagents. A freeze-dried reagent has to be dissolved by a solvent when used for such an analysis.

Small fragments of a freeze-dried reagent attach to wall surfaces and a part around the lid of the reagent container containing the freeze-dried reagent. In dissolution of a freeze-dried reagent, therefore, such fragments of the freeze-dried reagent have to be dissolved. If the fragments of the freeze-dried reagent attached to a reagent container remain undissolved, the concentration of the reagent is reduced even if an accurate amount of a solvent is dispensed, possibly leading to an error in the analysis result.

Thus, in order to dissolve a freeze-dried reagent in a solvent, an operation of inversion mixing has heretofore been performed mainly by a hand method after dispensing the solvent into the freeze-dried reagent.

However, when the inversion mixing is performed in such a manner, liquid may leak from an opening of a reagent container.

As a technique for sealing an opening of a reagent container while preventing contact of a reagent liquid with the external air, PTL 1 discloses a configuration of a reagent container including an adaptor having a tip end formed into a pouch shape, the adaptor being detachable from a container that contains a reagent, the adaptor having a slit portion as incisions at the tip end such that the slit portion opens when the tip end is pushed by a pippete which is a liquid dispensing mechanism. This configuration allows for suction of a liquid while maintaining a sealed state.

PTL 2 discloses a configuration including: a tube having substantially the same outer diameter as an opening of a reagent container, the tube having an opening in each of a part of the top and a part of the bottom; and films provided to cover the openings on the top and the bottom of the tube, the films being able to be released in use of the reagent container.

CITATION LIST

Patent Literature

PTL 1: JP-A-2002-19855
PTL 2: JP-A-2011-153936

SUMMARY OF INVENTION

Technical Problems

As described above, when a solvent is dispensed into a freeze-dried reagent and subjecting the mixture to inversion mixing, the reagent container has to be brought sideways and upside-down. At this time, liquid may leak from an opening of the reagent container. Furthermore, the operation of inversion mixing is performed by a hand method and thus requires time and effort.

However, in the configuration of a reagent container disclosed in PTL 1, the sealed state is maintained even in the state where a pippete is inserted in the slits of the slit portion, and therefore the pressure in the reagent container increases by dispensing a solvent for a freeze-dried reagent. In addition, since the opening of the adaptor is located in the liquid at this time, the liquid can seep out from a gap between the slit and the pippete.

In the configuration of a reagent container described in PTL 2, the films have to be released to expose the openings when a solvent for dissolving a freeze-dried reagent is dispensed, and inversion mixing in this state may cause liquid to spill out of the reagent container. In order to restore the sealed state after dispensing the solvent to prevent the spill-out, films have to be placed on the openings, which gives trouble.

In either document, automation of the operation of inversion mixing is not considered.

In view of the above problems, the present invention is directed to realization of accurate dissolution of a freeze-dried reagent and labor saving of users by automatically performing dispensing of a solvent into a freeze-dried reagent and inversion mixing of the mixture without any liquid spilled out of the reagent container.

Solution to Problem

As an aspect for solving the above problems, provided are a device including a reagent container, a reagent disk for holding the reagent container, a dispensing mechanism for dispensing a solution into the reagent container, an inversion mixing mechanism for subjecting the reagent container to inversion mixing, and a control unit for controlling the dispensing mechanism and the inversion mixing mechanism, the inversion mixing mechanism having a rotating mechanism for rotating the reagent container and a tilting mechanism for tilting a rotating shaft of the reagent container, the reagent container having a lid that can be pierced, the lid having a tubular mechanism that has an opening formed at a tip end and extends inside the reagent container, the control unit controlling the dispensing conditions of the dispensing mechanism so that the position of the opening formed at the tip end of the tubular mechanism is above the liquid surface of the solution contained in the reagent container regardless of whether the reagent container is held upright, upside-down, or sideways by the inversion mixing mechanism; a method using the device; and a reagent container for use in the device.

Advantageous Effects of Invention

According to the above aspect, in operations of dispensing of a solvent into a freeze-dried reagent and inversion mixing, the operations can be automatically performed without any reagent spilled out of the reagent container. Thus, accurate dissolution of the freeze-dried reagent can be performed, realizing a highly accurate analysis and contributing to labor saving of users.

DESCRIPTION OF EMBODIMENTS

Embodiments of the present invention will be explained in detail with reference to the drawings. The same sign is added to components having the same function throughout all the drawings in principle and the explanation will be omitted in some cases.

Example 1

<Entire Configuration of Device>

Figure 1:
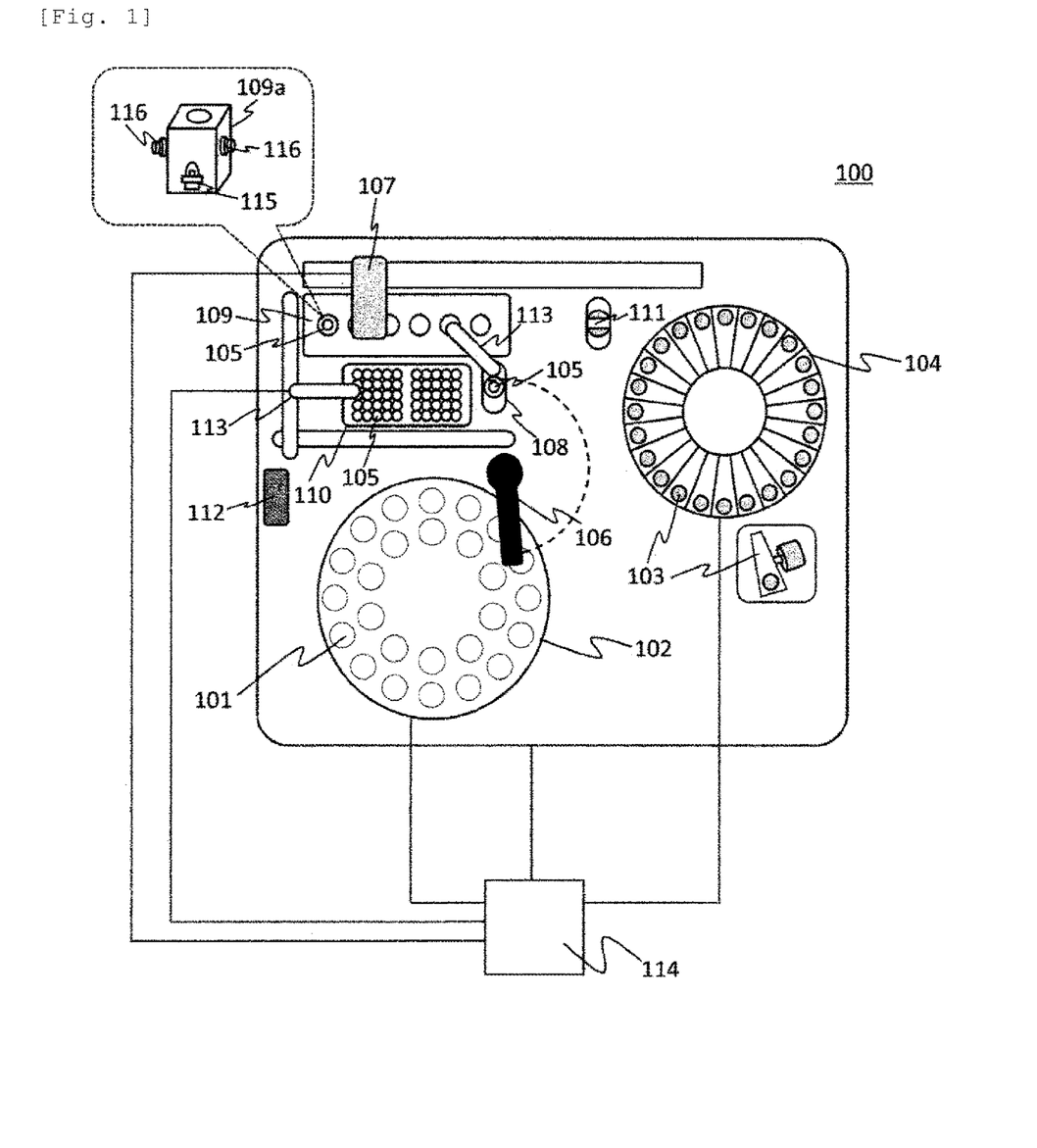
FIG. 1 is a view showing a basic configuration of an automatic analysis device according to the present embodiment.

FIG. 1 shows a basic configuration of an automatic analysis device according to the present embodiment. As an aspect of the automatic analysis device, an example of a device for performing a blood clotting analysis is explained here. As shown in FIG. 1, an automatic analysis device 100 is mainly composed of a sample disk 102, a reagent disk 104, a sample dispensing mechanism 106, a reagent dispensing mechanism 107, a sample dispensing port 108, an analysis port 109, a reaction container supplying unit 110, a reaction container transferring mechanism 113, and a control unit 114.

The sample disk 102 is a disk-shaped unit that is rotatable in a clockwise or counterclockwise direction, and a plurality of sample containers 101 for containing samples, such as a standard sample or samples to be tested, can be placed on the circumference thereof.

The reagent disk 104 is a disk-shaped unit that is rotatable in a clockwise or counterclockwise direction like the sample disk 102, and a plurality of reagent containers 103 can be placed on the circumference thereof, the reagent containers each containing a reagent containing a component that reacts with a component of each test item contained in a sample. Although not shown in the drawing, the reagent disk 104 may be provided with a cooling mechanism or the like such that reagents in the reagent containers 103 placed can be cooled.

The reaction container transferring mechanism 113 transfers a reaction container 105 to be used in an analysis from the reaction container supplying unit 110 to the sample dispensing port 108. The reaction container transferring mechanism 113 also transfers the reaction container 105, after the sample is dispensed, from the sample dispensing port 108 to the analysis port 109. After completion of the analysis, the reaction container transferring mechanism 113 transfers the reaction container 105 from the analysis port 109 to a container disposal unit 112.

The sample dispensing mechanism 106 sucks a sample in the sample container 101 held on the sample disk 102, and dispenses the sample into the reaction container 105 placed in the sample dispensing port 108. In the sample dispensing mechanism 106, a sample dispensing nozzle is connected to a sample pump or a sample syringe (not shown) via a flow channel, and, for example, water is used as a pressure transmission medium. The suction and discharge of the sample is achieved by an operation of the sample syringe or the sample pump, and the operation is controlled based on an instruction of the control unit 114. Rotation and vertical movements of the sample dispensing mechanism are controlled based on an instruction of the control unit 114.

The reagent dispensing mechanism 107 sucks a reagent in the reagent container 103 held on the reagent disk 104 and dispenses the reagent into the reaction container 105 which has the sample dispensed therein and is placed in the analysis port 109. In the reagent dispensing mechanism 107, a reagent dispensing nozzle is connected to a reagent pump or a reagent syringe (not shown) via a flow channel, and, for example, water is used as a pressure transmission medium. The suction and discharge of the reagent is achieved by an operation of the reagent syringe or the reagent pump, and the operation is controlled based on an instruction of the control unit 114. Horizontal and vertical movements of the reagent dispensing mechanism 107 are controlled based on an instruction of the control unit 114.

A washing mechanism 111 washes the sample dispensing mechanism 106 and the reagent dispensing mechanism 107.

A plurality of the reaction containers 105 can be placed in the analysis port 109 to allow a plurality of samples to be analyzed at the same time. The analysis port 109 includes a light source 115 and a light receiving unit (detector) 116 for each of the reaction containers 105 held therein. Light is emitted from the light source 115 toward a reaction liquid 704 in the reaction container 105 and is scattered by a precipitation produced by a reaction caused in a reaction liquid. As the precipitation increases, the scattered light increases. Thus, the amount of the precipitation can be determined by detecting the scattered light by the light receiving unit (detector) 116.

For example, in a blood clotting test item, when a sample is reacted with a reagent, fibrin precipitates with the elapsed time. The quantity of light scattered also increases as fibrin precipitates. The amount of fibrinogen (Fbg) in the sample can be determined by detecting the quantity of light. Other blood clotting test items, such as the prothrombin time (PT) and the activated partial thromboplastin time (APTT), can be analyzed by monitoring the quantity of light in the same manner while using a reagent corresponding to the respective test items.

Throughout the whole configuration, the control unit 114 controls vertical and horizontal movements of the sample disk 102, the reagent disk 104, the sample dispensing mechanism 106, and the reagent dispensing mechanism 107, operations of the sample syringe pump and the reagent syringe pump not shown, operation for supplying washing water (not shown) in the washing mechanism 111, operations of the light source 115 and the light receiving unit 116 in the analysis port 109a, operations for data processing, such as calculations of a blood clotting time or a concentration of a target component based on detection results, and other operations of various components constituting the automatic analysis device 100, and sets conditions of the components, for example. The control unit 114 is connected to each component to control the entire automatic analysis device in FIG. 1, but an independent control unit may be provided for each component.

<Relationship of Structure of Reagent Container and Liquid Surface of Solution Contained Therein>

The reagent container 103 will be explained with reference to FIG. 3. FIG. 3(a) to (c) show a shape of a reagent container according to the embodiment.

When inversion mixing of a freeze-dried reagent and a solvent is performed in the reagent container 103 having an opening, the height of the liquid surface in the reagent container has to be lower than the opening.

Figure 3A:
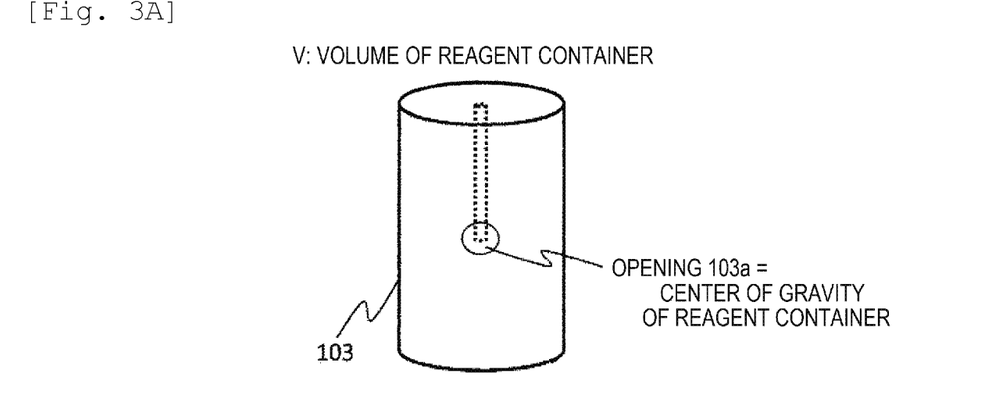
FIGS. 3A to 3C are views showing a shape of a reagent container according to the embodiment (first embodiment).

When the reagent container 103 has a column shape or a spherical shape and has an opening 103a at the center of gravity of the reagent container 103 as shown in FIG. 3(a), the amount of the liquid which is less than V/2 based on the volume V of the reagent container 103 provides the height of the liquid surface lower than the opening 103a regardless of the posture of the reagent container 103.

Figure 3B:
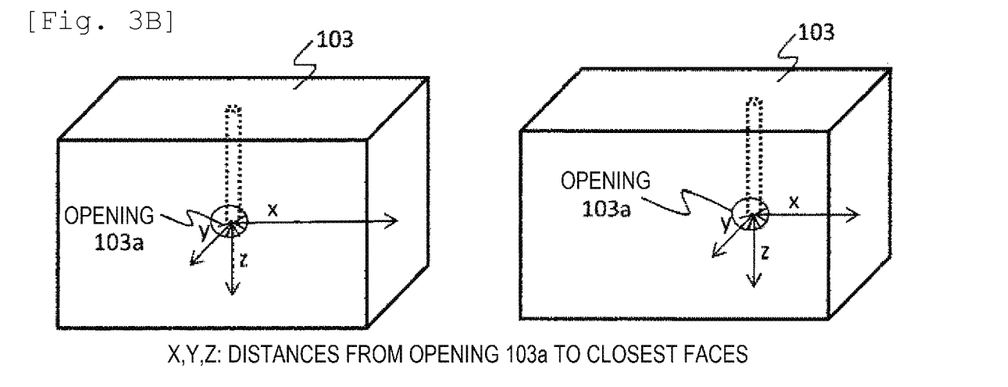

The left figure of FIG. 3 (b) shows a state where the opening 103a of the reagent container 103 having a quadrangular prism shape exists at the center of gravity of the reagent container 103. The right figure shows a state where the opening 103a in the reagent container 103 having the same quadrangular prism shape exists at a position displaced from the center of gravity. Particularly in the reagent container 103 of a quadrangular prism shape as shown in FIG. 3, whatever position the opening is formed, the amount of the liquid which is less than 4xyz, wherein x, y, and z represents distances from the opening 103a to the closest faces, provides the height of the liquid surface lower than the opening 103a regardless of the posture of the reagent container 103.

Figure 3C:
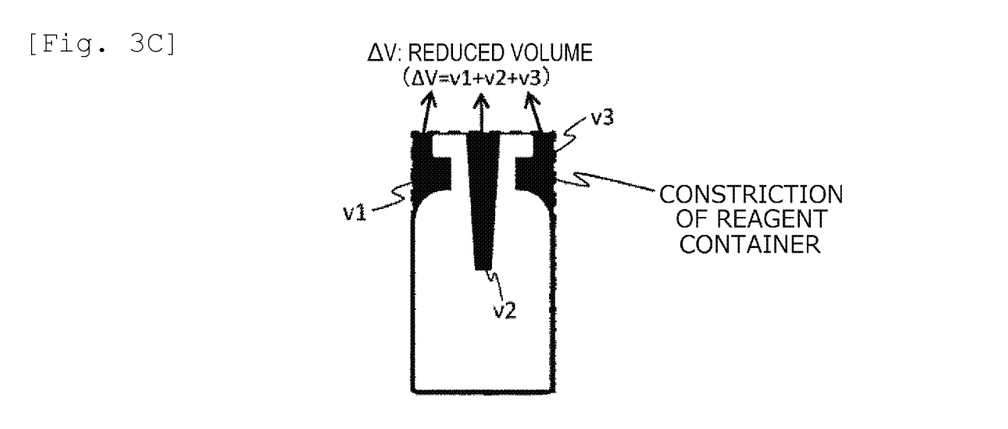
Figure 4A:
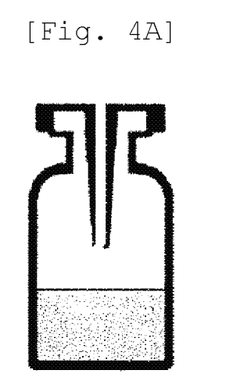
FIGS. 4A to 4E are views showing positional relationships of an opening of the reagent container and a liquid surface of a dissolved reagent when the reagent container according to the embodiment (first embodiment) is held upright, sideways, and upside-down.
Figure 4B:
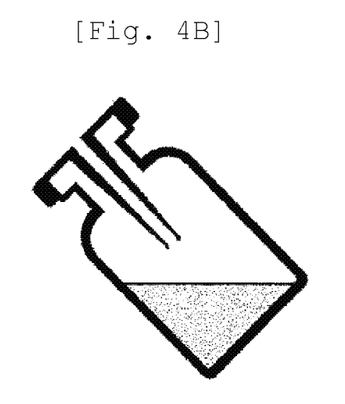
Figure 4C:
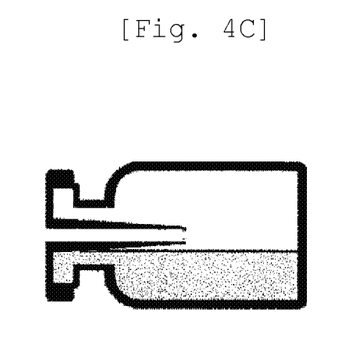
Figure 4D:
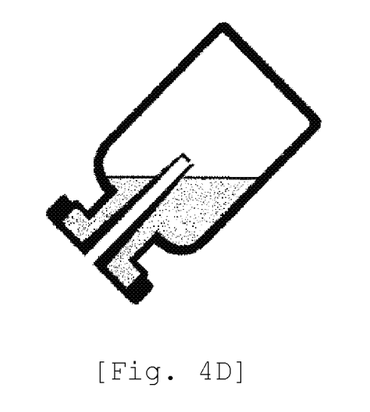
Figure 4E:
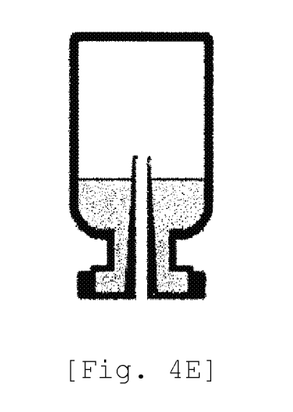

In the reagent container 103 of a column shape having a volume increased or decreased due to a constriction, concave, or convex or due to the structure of a lid b and the like of the reagent container 103 as shown in FIG. 3 (c) (FIG. 3 (c) shows a configuration with a volume decreased by ΔV from the original volume V of the reagent container), the amount of the liquid which is less than V/2−ΔV, which is a value after subtraction of the volume variation ΔV, provides the height of the liquid surface located lower than the opening 103a regardless of the posture of the reagent container 103.

Besides the above aspect, any shape of the reaction container 103 and any position of the opening 103a can be adopted as long as they satisfy the condition that the height of the liquid surface is lower than the opening 103a whatever posture the reagent container 103 is held with a solution contained therein.

<Automatic Dissolution of Freeze-Dried Reagent>

Figure 6:
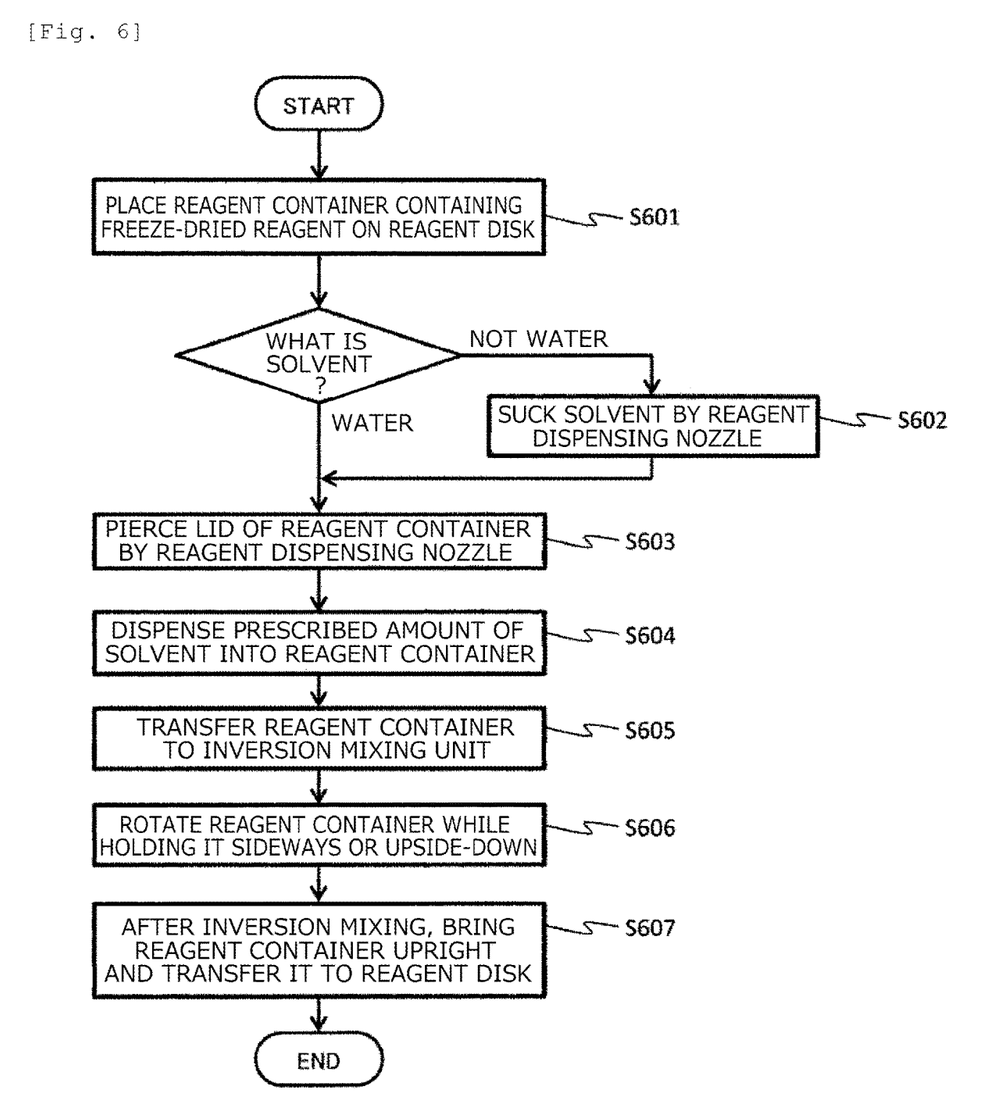
FIG. 6 is a flowchart for explaining inversion mixing of a freeze-dried reagent according to the embodiment (first embodiment).

Next, an automatic dissolution function of a freeze-dried reagent 201 according to the embodiment will be explained by reference to FIG. 2 and a flowchart of FIG. 6. FIG. 2(a) to (e) are views for explaining inversion mixing of a freeze-dried reagent according to the embodiment. FIG. 6 is a flowchart for explaining inversion mixing of a freeze-dried reagent according to the embodiment.

Figures 2A, 2B:
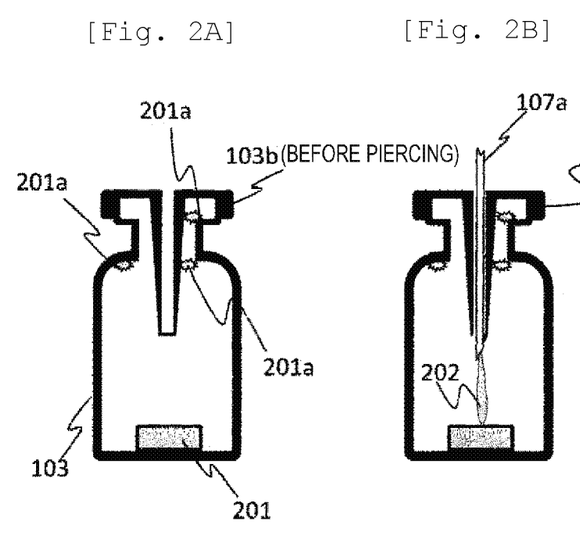
FIGS. 2A to 2E are views for explaining inversion mixing of a freeze-dried reagent according to the embodiment (first embodiment).

First, in a step 601, the reagent container 103 containing the freeze-dried reagent 201 is placed on the reagent disk 104 <S601> as shown in FIG. 2(a). At this time, the reagent container 103 has small freeze-dried reagent fragments 201a attached to an upper part thereof.

Next, when a solvent 202 for the freeze-dried reagent 201 is not water in a configuration where the pressure transmission medium of the reagent dispensing mechanism 107 is water, the control unit 114 controls an operation so as to suck the solvent from a solvent container by the reagent dispensing mechanism 107 <S602>. On the other hand, when the solvent 202 is water, water which is the pressure transmission medium of the reagent dispensing mechanism 107 can also be dispensed into the reagent container 103 and suction of the solvent is thus not necessary.

Figure 2C:
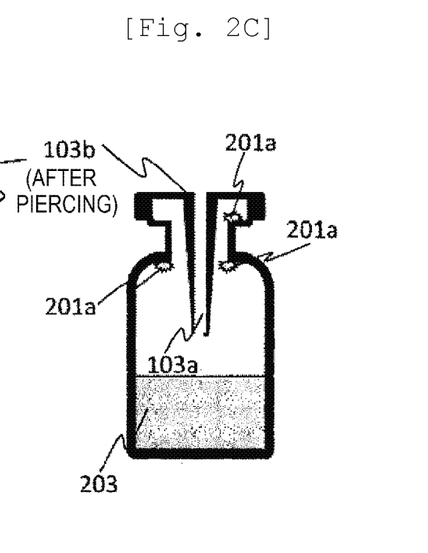

The reagent container 103 containing the freeze-dried reagent 201 is sealed by a lid 103b. As shown in FIG. 2(b), the lid 103b of the reagent container can be pierced by a nozzle of the reagent dispensing mechanism 107, a piercing needle, or the like. The solvent 202, when to be dispensed into the reagent container 103, can be dispensed by piercing the lid 103b. The reagent dispensing nozzle of the reagent dispensing mechanism 107 thus pierces the lid 103b of the reagent container 103 and dispenses a prescribed amount of the solvent 202 into the reagent container 103 <S603>. At this time, if the solvent 202 is merely dispensed into the reagent container 103, the small freeze-dried reagent fragments 201a attached to the upper part of the small reagent container 103 remains undissolved as shown in FIG. 2(c).

Figure 2D:
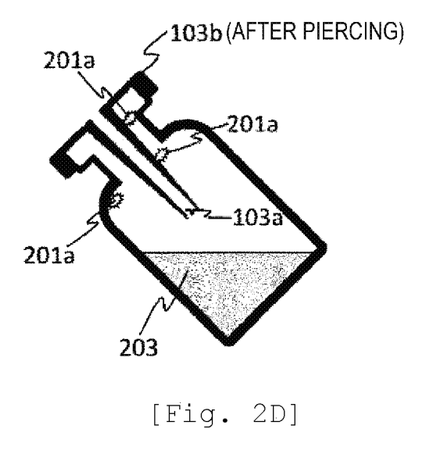
Figure 2E:
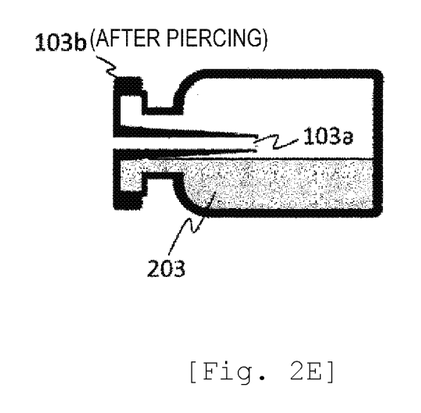

Subsequently, the reagent container 103 having the solvent 202 dispensed therein is transferred to an inversion mixing unit 119 described later <S605> and subjected to inversion mixing <S606> as shown in FIG. 2(d) (e). The lid 103b of the reagent container is opened by piercing by the nozzle of the reagent dispensing mechanism 107 as described above. Therefore, if the opening 103a is located below the liquid surface of a dissolved reagent 203 and enters the liquid, the dissolved reagent 203 spills out of the reagent container 103 through the opening 103a. However, when the relationship between the structure of the reagent container 103 and the liquid surface of the contained solution satisfies the aforementioned condition, the opening 103a is always located above the liquid surface whatever angle, such as sideways and upside-down, the reagent container 103 is brought, and therefore the liquid never spills out of the reagent container 103. After the inversion mixing, the reagent container 104 is brought upright and the reagent container 103 is transferred to the reagent disk 104 <S607>.

<Configuration of Inversion Mixing Unit>

Figure 5A:
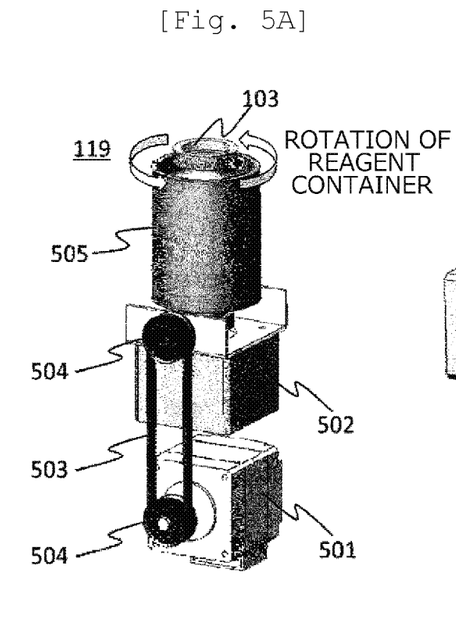
FIGS. 5A to 5D are views showing a configuration of an inversion mixing unit according to the embodiment (first embodiment).
Figure 5B:
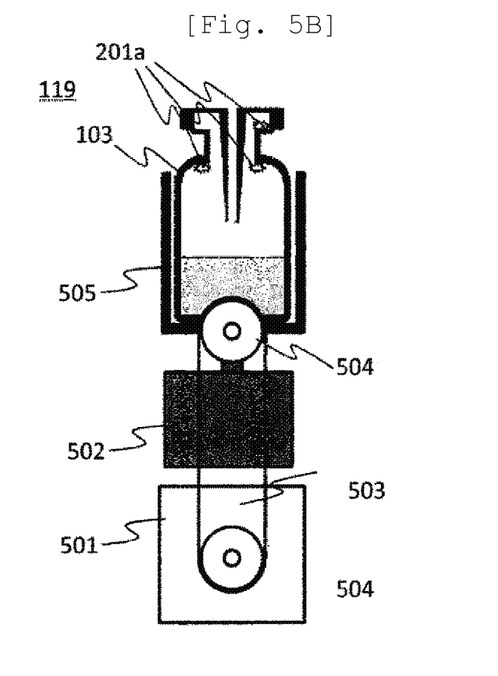
Figure 5C:
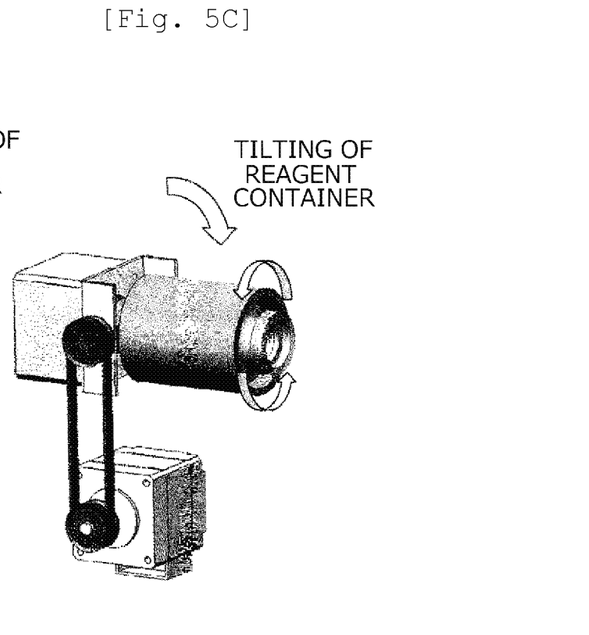
Figure 5D:
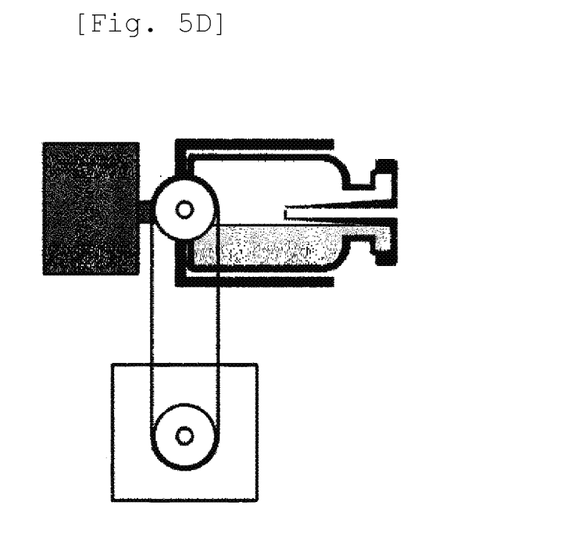

Next, the configuration of the inversion mixing unit 119 according to the embodiment will be explained with reference to FIGS. 5A to 5D. FIG. 5A shows the reagent container 103 in an upright state and FIG. 5B is a schematic diagram thereof. FIG. 5C shows the reagent container 103 in a sideways state and FIG. 5D is a schematic diagram thereof. As shown in FIGS. 5A to 5D, the inversion mixing unit 119 is provided with two driving units of a rotating shaft tilting motor 501 and a rotation motor 502.

The rotating shaft tilting motor 501 is connected to a reagent container holder 505 via a belt 503 and two pulleys 504. The reagent container 103 is held in the reagent container holder 505. By driving the rotating shaft tilting motor 501, the reagent container holder 505 tilts and the reagent container 103 held therein tilts. The rotation motor 502 is connected to the reagent container holder 505 and can rotate the reagent container holder 505 together with the reagent container 103 held therein. The rotating shaft tilting motor 501 and the rotation motor 502 can each be independently driven.

A method of inversion mixing of the reagent container 103 will be explained next. The reagent container 103 placed in the inversion mixing unit 119 performs inversion mixing of the freeze-dried reagent 201 and the solvent 202 contained therein by tilting the rotating shaft thereof while rotating. The rate of the rotation at this time is preferably appropriately 40 rpm, for example.

In order to dissolve the freeze-dried reagent 201, it is desirable that the angle of the rotating shaft in the inversion mixing be varied, for example, in the range of 70° to 110° and the reagent container 103 be rotated while being shaken for the purpose of dissolving the small freeze-dried reagent fragments 201a attached on an upper part of the reagent container 103. This enables the solvent 202 to spread to the upper part of the reagent container 103 to dissolve the small freeze-dried reagent fragments 201a attached to the upper part of the reagent container 103.

On the other hand, in the case of the dissolved reagent 203 that has a gradient in the concentration, such as a reagent that is likely to generate precipitation, it is desirable that the reagent container 103 be rotated while varying the angle of the rotating shaft in the range of 35° to 55° around 45° and shaking the container. In this case, the reagent with precipitation generated can be mixed by regularly performing the rotation under this condition at prescribed time intervals, for example, every 30 minutes. In this case, an amount of the reagent that satisfies the condition that the height of the liquid surface is lower than the opening regardless of the posture as described above is required to be contained in the reagent container in advance.

When the solution after dissolution of the freeze-dried reagent fragments 201a is mixed again to make the concentration uniform, the reagent container can be rotated while varying the angle in the same condition.

In any dissolving method, the reagent can be prevented from foaming by varying the angle of the rotating shaft at a rate to the extent that does not ruffle the liquid surface.

When the reagent container 103 is returned to an upright state from a sideways or upside-down state, the angle of the rotating shaft is slowly returned and thereby the dissolved reagent 203 can be held on the bottom of the reagent container 103 without adhering to the wall surfaces or the upper part of the reagent container 103 due to the surface tension.

Since inversion mixing can thus be performed without any liquid in the reagent container 103 spilled out of the reagent container 103, the small freeze-dried reagent fragments 201a attached to the wall surfaces or apart around the lid of the reagent container 103 can be dissolved, and thus the variation in the reagent concentrations among containers can be reduced. In addition, the reagent can be dissolved without troubling the user's hand.

Example 2

In the first embodiment, a method in which the reagent dispensing mechanism 107 dispenses a prescribed amount of the solvent 202 into the reagent container 103 containing the freeze-dried reagent 201 has been explained.

In this embodiment, a method for dispensing the solvent 202 in two or more divided portions will be explained. When dispensing is performed in several divided portions under a prescribed condition, the amount of a reagent held in a reagent container can be increased as described below.

Figure 7:
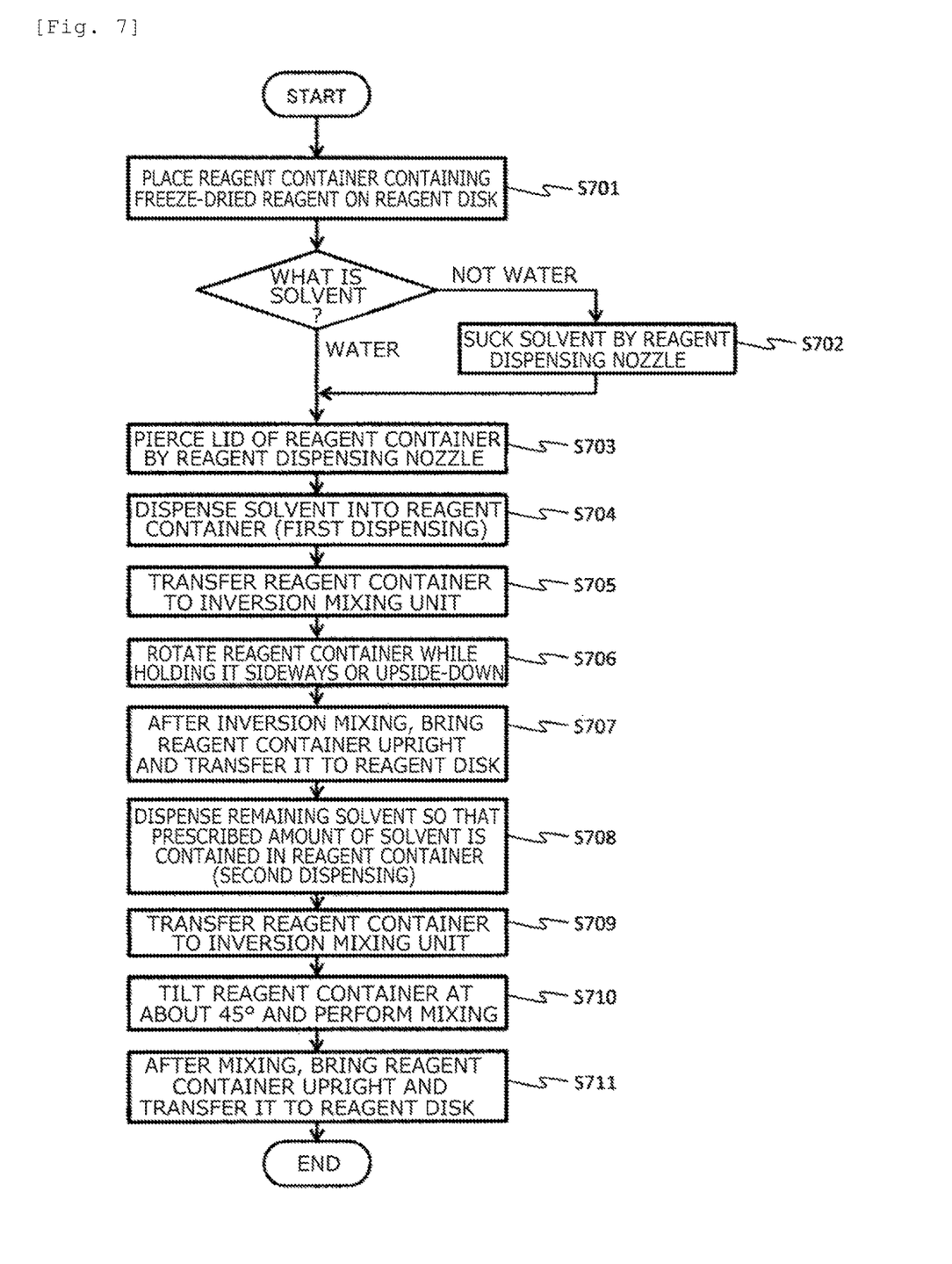
FIG. 7 is a flowchart for explaining inversion mixing of a freeze-dried reagent according to the embodiment (second embodiment)

FIG. 7 is a flowchart for explaining inversion mixing of a freeze-dried reagent according to the second embodiment. Since the procedure is the same as in FIG. 6 (first embodiment) until S707, the explanation will be omitted. The amount of the first dispensing of the solvent 202 has to satisfy the condition that it is equal to or more than an amount that can dissolve the freeze-dried reagent 201 without saturation and equal to or less than such an amount that the liquid surface is located below the opening of the reagent container 103 regardless of the tilting angle.

Figure 8:
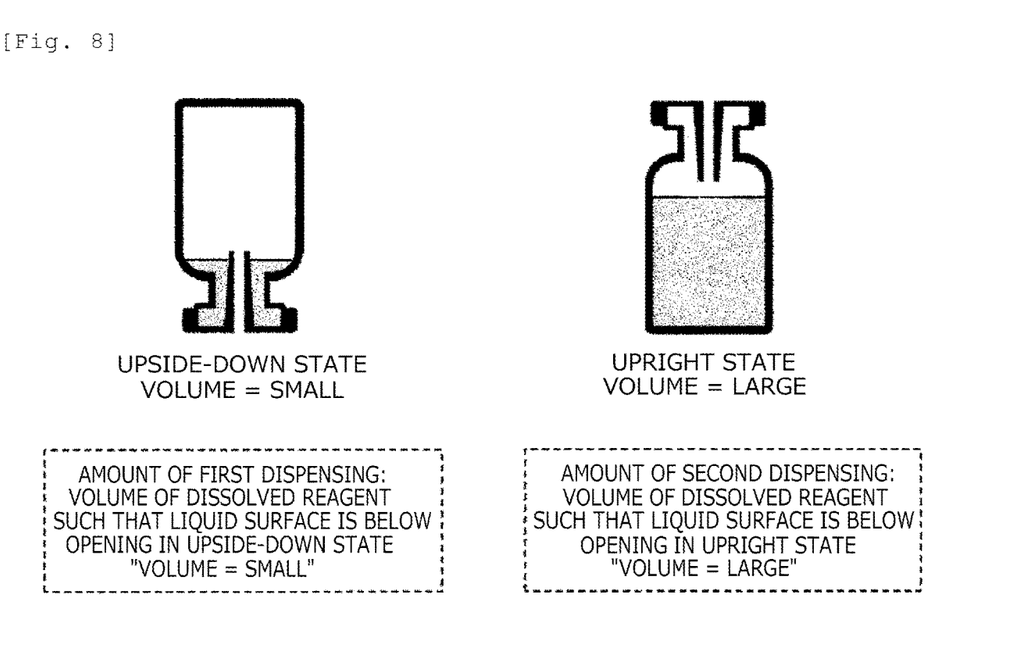
FIG. 8 is a view showing a relationship of the number of divided portions for dispensing and the amount of a contained reagent according to the embodiment (second embodiment).

FIG. 8 shows a relationship between the number of divided portions in dispensing and the amount of the held reagent according to the second embodiment. As a precondition for increasing the amount of the reagent held in the reagent container by performing dispensing in several divided portions, a difference is required to be present in the volumes of the dissolved reagent 203 required for locating the liquid surface below the opening of reagent container between the upright state and the upside-down state of the reagent container. For example, the case where the opening of the reagent container is located closer to the lid and the case where there is a difference in the volumes between the two states due to the shape of the reagent container are mentioned. In order to satisfy the condition of the amount of the first dispensing of the solvent 202 as described above under the above precondition, the amount of the solvent 202 dispensed has to be such an amount that the liquid surface is located below the opening in the upside-down state which provides the smallest volume of the dissolved reagent 203. Accordingly, as shown in the left figure of FIG. 8, the volume of dispensing is "small".

After the solvent 202 dispensed in the first dispensing is subjected to inversion mixing, the reagent container 103 is placed on the reagent disk 104. In the subsequent second dispensing, the remaining solvent 202 is dispensed so that the dissolved reagent 203 becomes a prescribed amount <S708>. At this time, as a condition of the amount of the second dispensing of the solvent 202, the liquid surface has to be located below the opening in the upright state which provides the largest volume of the dissolved reagent 203. Accordingly, as shown in the right figure of FIG. 8, the volume of dispensing is "large".

After the second dispensing, the reagent container 103 is placed again in the inversion mixing unit 119 and is mixed <S709>. At this time, since the small freeze-dried reagent fragments 201a attached to wall surfaces or a part around the lid of the reagent container 103 has already been dissolved in the first inversion mixing, the mixing is singly performed with the rotating shaft of the reagent container 103 tilted at an angle of approximately 45° <S710>. After mixing, the reagent container 103 is brought upright, and is transferred to the reagent disk 104 <S711>.

When the solvent 202 is dispensed by only one dispensing operation, the amount of dispensing has to be set, under the aforementioned precondition, to an amount corresponding to the posture of the reagent container providing the smallest volume. According to this embodiment, however, the amount of the dissolved reagent 203 that can be held in the reagent container 103 is larger than in the first embodiment while implementing automatic dissolution of the freeze-dried reagent, and therefore the volume of the reagent container 103 can be efficiently used.

The present invention is not limited to the foregoing embodiments and includes various modification examples. For example, the foregoing embodiments are described in detail for explaining the present invention in an easy-to-understand manner, and the present invention is not necessarily limited to an embodiment that includes all the configurations described above. A part of an embodiment may be replaced with a configuration of another embodiment. A configuration of an embodiment may be added to a configuration of another embodiment. A part of a configuration of each embodiment may be added to, deleted from, or replaced with another configuration.

REFERENCE SIGNS LIST

100 Automatic analysis device
101 Sample container
102 Sample disk
103 Reagent container
103a Opening
103b Reagent container lid
104 Reagent disk
105 Reaction container
106 Sample dispensing mechanism
107 Reagent dispensing mechanism
107a Reagent dispensing probe
108 Sample dispensing port
109 Analysis unit
109a Analysis port
110 Reaction container supplying unit
111 Washing mechanism
112 Reaction container disposal unit
113 Reaction container transferring mechanism
114 Control unit
115 Light source
116 Light receiving unit (detector)
119 Inversion mixing unit
201 Freeze-dried reagent
201a Freeze-dried reagent fragment
202 Solvent
203 Dissolved reagent
501 Rotating shaft tilting motor
502 Rotation motor
503 Belt
504 Pulley
505 Reagent container holder
704 Reaction liquid (mixed liquid of sample and reagent)

The invention claimed is:

1. An automatic analysis device comprising
a reagent container,
a reagent disk for holding the reagent container,
a dispensing mechanism for dispensing a liquid into the reagent container,
an inversion mixing mechanism for subjecting the reagent container to inversion mixing, and
a control unit for controlling the dispensing mechanism and the inversion mixing mechanism, wherein
the inversion nixing mechanism comprises:
a rotating mechanism comprising a first motor for rotating the reagent container via a rotating shaft coupled directly to the first motor, and
a tilting mechanism comprising a second motor, which is coupled to a pulley disposed on the rotating mechanism, for tilting both the first motor and rotating shaft of the rotating mechanism,
wherein a rotational axis of the pulley is disposed perpendicularly to the rotational axis of the rotating shaft of the rotating mechanism,
the reagent container comprises:
a lid that can be pierced by a nozzle of the dispensing mechanism or a piercing needle to form an opening, the lid having a tubular mechanism that has the opening formed at a tip end and extends inside the reagent container to a depth corresponding to the center of gravity of the reagent container when empty, and
the control unit is configured to:
control dispensing conditions of the dispensing mechanism so that the position of the opening formed at the tip end of the tubular mechanism is above the liquid surface of the liquid contained in the reagent container regardless of whether the reagent container is held upright, upside-down, or sideways by the inversion mixing mechanism,
control placing the reagent container on the reagent disk,
control piercing of the lid by the dispensing mechanism to form the opening,
control dispensing the liquid into the reagent container, and
control performing inversion mixing by tilting the reagent container placed in the inversion mixing mechanism while rotating the reagent container.

2. The automatic analysis device according to claim 1, wherein
the reagent container contains a freeze-dried reagent in advance,
the liquid dispensed by the dispensing mechanism is a solvent for dissolving the freeze-dried reagent,
the control unit controls the rotating mechanism and the tilting mechanism so as to rotate the reagent container while holding the rotating shaft of the rotating mechanism sideways or upside-down when the freeze-dried reagent is dissolved in the solvent.

3. The automatic analysis device according to claim 2, wherein
the control unit controls the rotating mechanism and the tilting mechanism so as to rotate the reagent container while tilting the rotating shaft of the rotating mechanism in the range of about 35° to 55° when a mixed liquid obtained after dissolving the freeze-dried reagent in the solvent is mixed.

4. The automatic analysis device according to claim 3, wherein
the control unit controls the rotating mechanism and the tilting mechanism so as to rotate the reagent container while tilting the rotating shaft of the rotating mechanism at about 45°.

5. The automatic analysis device according to claim 1, wherein
the liquid dispensed by the dispensing mechanism is a reagent having a concentration gradient,
the control unit controls the rotating mechanism and the tilting mechanism so as to rotate the reagent container while tilting the rotating shaft of the rotating mechanism in the range of about 35° to 55° when the reagent is mixed.

6. The automatic analysis device according to claim 5, wherein
the control unit controls the rotating mechanism and the tilting mechanism so as to rotate the reagent container while tilting the rotating shaft of the rotating mechanism at about 45°.

7. The automatic analysis device according to claim 1, wherein
the control unit controls the dispensing mechanism so as to dispense the liquid in several divided portions into the reagent container.

8. The automatic analysis device according to claim 1, wherein
the rotational axis of the pulley intersects the rotational axis of the rotating shaft of the rotating mechanism.

9. The automatic analysis device according to claim 1, further comprising: a belt disposed on the pulley and mechanically coupled to the second motor.

10. An analysis method using an automatic analysis device comprising:
- a reagent container,
- a reagent disk for holding the reagent container,
- a dispensing mechanism for dispensing a solution into the reagent container,
- an inversion mixing mechanism for subjecting the reagent container to inversion mixing, and
- a control unit for controlling the dispensing mechanism and the inversion mixing mechanism, the inversion mixing mechanism comprising:
- a rotating mechanism comprising a first motor for rotating the reagent container via a rotating shaft coupled directly to the first motor, and
- a tilting mechanism comprising a second motor, which is coupled to a pulley disposed on the rotating mechanism, for tilting both the first motor and the rotating shaft of the rotating mechanism,
- wherein a rotational axis of the pulley is disposed perpendicularly to the rotational axis of the rotating shaft of the rotating mechanism, the reagent container comprising:
- a lid that can be pierced by a nozzle of the dispensing mechanism or a piercing needle to form an opening, the lid having a tubular mechanism that has the opening formed at a tip end and extends inside the reagent container to a depth corresponding to the center of gravity of the reagent container when empty, the control unit:
- controlling dispensing conditions of the dispensing mechanism so that the position of the opening formed at the tip end of the tubular mechanism is above the liquid surface of the solution contained in the reagent container regardless of whether the reagent container is held upright, upside-down, or sideways by the inversion mixing mechanism,
- placing the reagent container on the reagent disk, piercing the lid by the dispensing mechanism to form the opening, dispensing the solution into the reagent container, and
- performing inversion mixing by tilting the reagent container placed in the inversion mixing mechanism while rotating the reagent container.

11. The analysis method according to claim 10, wherein the rotational axis of the pulley intersects the rotational axis of the rotating shaft of the rotating mechanism.

12. The analysis method according to claim 10, wherein: a belt is disposed on the pulley and mechanically coupled to the second motor.

* * * * *